United States Patent
Rajaie et al.

(10) Patent No.: US 12,024,223 B2
(45) Date of Patent: Jul. 2, 2024

(54) SYSTEM AND METHOD OF CONTROLLING TETHERED SELF-PROPELLED PLATFORMS

(71) Applicant: GM Global Technology Operations LLC, Detroit, MI (US)

(72) Inventors: Mohammad Amin Rajaie, Richmond Hill (CA); Hossein Sadjadi, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 946 days.

(21) Appl. No.: 17/038,783

(22) Filed: Sep. 30, 2020

(65) Prior Publication Data
US 2022/0097765 A1 Mar. 31, 2022

(51) Int. Cl.
G05D 1/00 (2024.01)
B62D 13/00 (2006.01)
B62D 59/04 (2006.01)

(52) U.S. Cl.
CPC ........... *B62D 13/005* (2013.01); *B62D 59/04* (2013.01); *G05D 1/0223* (2013.01)

(58) Field of Classification Search
CPC .................................................. B62D 13/005
See application file for complete search history.

(56) References Cited

U.S. PATENT DOCUMENTS

| | | | | |
|---|---|---|---|---|
| 2009/0153363 | A1* | 6/2009 | Lapp | G01C 5/005 340/973 |
| 2010/0049374 | A1* | 2/2010 | Ferrin | G05D 1/0295 701/1 |
| 2011/0121998 | A1* | 5/2011 | Glover | G08G 5/0013 340/961 |
| 2014/0200768 | A1* | 7/2014 | Tsuruta | B62D 15/025 701/41 |
| 2017/0097410 | A1* | 4/2017 | Liu | G01S 13/589 |
| 2018/0093650 | A1* | 4/2018 | Payne | B60T 8/172 |
| 2018/0356517 | A1* | 12/2018 | Cieslar | G01S 13/726 |
| 2019/0096264 | A1* | 3/2019 | Park | B60W 30/165 |
| 2019/0193694 | A1* | 6/2019 | Sunahara | B60T 8/1755 |
| 2020/0088171 | A1* | 3/2020 | Göldner | F03D 17/00 |

* cited by examiner

*Primary Examiner* — Redhwan K Mawari
*Assistant Examiner* — Paul W Arellano
(74) *Attorney, Agent, or Firm* — Vivacqua Crane, PLLC

(57) ABSTRACT

A method of controlling tethered self-propelled platforms is provided. The method comprises providing a platform leader and a platform follower connected to the leader with a tether to define a first heading line of the leader and a first coordinate frame of the follower. Each of the leader and the follower is pivotally moveable relative to the tether, defining a leader angle and a follower angle. The method further comprises estimating a predicted position of the leader based on a current position, a current speed, and a current yaw rate of the leader. The predicted position of the leader defines a predicted heading line of the leader. The method further comprises determining a trajectory of the follower from the first coordinate frame to the predicted heading line defining a second coordinate frame of the follower. The trajectory is based on a desired distance the predicted heading line and a desired change in yaw angle of the follower. The method further comprises moving the follower along the trajectory to the second coordinate frame.

12 Claims, 3 Drawing Sheets

SYSTEM AND METHOD OF CONTROLLING TETHERED SELF-PROPELLED PLATFORMS

INTRODUCTION

The present disclosure relates systems and methods of self-propelled platforms and, more particularly, systems and methods of controlling tethered self-propelled platforms.

Self-propelled platforms may be used for delivery systems. Conventional methods may limit the maneuverability of the system and may impose undesirable forces on the system. However, improvements may be made.

SUMMARY

Thus, while current methods and systems may achieve their intended purpose, there is a need for a new and improved system and method for controlling tethered self-propelled platforms.

According to several aspects of the disclosure, a method of controlling tethered self-propelled platforms is provided. The method comprises providing a platform leader and a platform follower connected to the leader with a linear tether to define a first heading line of the leader and a first coordinate frame of the follower. The tether may be a rigid or non-rigid structure and having a length that is telescopically adjustable to allow linear movement between the leader and follower. Each of the leader and the follower is pivotally moveable relative to the tether, defining a leader angle and a follower angle, respectively.

It is to be understood that the method may provide one or a plurality of sequentially connected platform followers without departing from the spirit or scope of the present disclosure.

In this aspect of the disclosure, the method further comprises estimating a predicted position of the leader based on a current position, a current speed, and a current yaw rate of the leader relative to the first coordinate frame of the follower. The predicted position of the leader defines a predicted heading line of the leader. The method further comprises determining a trajectory of the follower from the first coordinate frame to a point on the predicted heading line defining a second coordinate frame of the follower. The trajectory is based on a desired distance to the point on the predicted heading line and a desired change in yaw angle of the follower. In this aspect, the method further comprises moving the follower along the trajectory to the second coordinate frame based on the desired distance and the desired change in yaw angle of the follower.

In another example of this aspect, the step of estimating the predicted position of the leader comprises determining the leader angle, the follower angle, and the length of the tether relative to the first coordinate frame of the follower. Moreover, the step of estimating further comprises estimating the current position of the leader based on at least one of the leader angle, the follower angle, and the length of the tether wherein the current position of the leader is the current location and the current orientation of the leader relative to the first coordinate frame of the follower.

In yet another example, The step of estimating the predicted position of the leader comprises determining the leader angle, the follower angle, and the length of the tether relative to the first coordinate frame of the follower. The step of estimating further comprises determining a rate of change of the leader angle, a rate of change of the follower angle, and a rate of change of the length of the tether relative to the first coordinate frame of the follower. The step of estimating further comprises determining follower speed and follower yaw rate and estimating the current speed and the current yaw rate of the leader based at least one of the leader angle, the follower angle, the length of the tether, the rate of change of the leader angle, the rate of change of the follower angle, the rate of change of the length of the tether, the follower speed, and the follower yaw rate.

In another example of this aspect, the step of determining the trajectory of the follower comprises determining the desired distance to the point on the predicted heading line and determining the desired change in yaw angle of the follower.

In yet another example, the desired distance may be a distance least traveled from the first coordinate frame to the point on the predicted heading line, and wherein the change in yaw angle of the follower is defined by the first heading line of the leader and the desired distance.

In yet another example, the desired distance may be a distance traveled within a least amount of time from the first coordinate frame to the point on the predicted heading line. In yet another example, the desired distance may be a distance traveled with a least amount of energy from the first coordinate frame to the point on the predicted heading line.

In still another example, the first heading line of the leader is in coaxial relationship with the first coordinate frame of the follower and the predicted heading line of the leader is in coaxial relationship with the second coordinate frame of the follower.

In another example of this aspect, The step of moving the follower along the trajectory to the second coordinate frame comprises determining a desired speed of the follower along the trajectory, the desired speed being based on the desired distance from the first coordinate frame of the follower to the point on the predicted heading line. Moreover, the step of moving comprises determining a desired yaw rate of the follower along the trajectory. The desired yaw rate is based on the desired change in yaw angle of the follower. Furthermore, the step of moving comprises moving the follower along the trajectory based on the desired speed and the desired yaw rate.

In another aspect of the disclosure, a method of controlling tethered self-propelled platforms is provided. The method comprises providing a platform leader and a platform follower connected to the leader with a linear tether to define a first heading line of the leader and a first coordinate frame of the follower. The tether may be a rigid or non-rigid structure having a length that is telescopically adjustable to allow linear movement between the leader and follower. Each of the leader and the follower is pivotally moveable relative to the tether, defining a leader angle and a follower angle, respectively.

It is to be understood that the method may provide one platform follower or a plurality of sequentially connected platform followers without departing from the spirit or scope of the present disclosure.

In this aspect, the method further comprises determining the leader angle, the follower angle, and the length of the tether relative to the first coordinate frame of the follower. Moreover, the method comprises estimating a current position of the leader based on at least one of the leader angle, the follower angle, and the length of the tether. The current position of the leader is the current location and the current orientation of the leader relative to the first coordinate frame of the follower. The method further comprises estimating a predicted position of the leader based on the current position, a current speed, and a current yaw rate of the leader relative to the first coordinate frame of the follower, the predicted position of the leader defining a predicted heading line of the leader.

In this aspect, the method further comprises determining a trajectory of the follower from the first coordinate frame to a point on the predicted heading line defining a second coordinate frame of the follower. The trajectory is based on a desired distance to the point on the predicted heading line and a desired change in yaw angle of the follower. The method further comprises moving the follower along the trajectory to the second coordinate frame based on the desired distance and the desired change in yaw angle of the follower.

In one example of this aspect, the step of estimating the predicted position of the leader comprises determining the leader angle, the follower angle, and the length of the tether relative to the first coordinate frame of the follower. Moreover, the method further comprises determining a rate of change of the leader angle, a rate of change of the follower angle, and a rate of change of the length of the tether relative to the first coordinate frame of the follower. Additionally, the method further comprises determining follower speed and follower yaw rate, and then estimating the current speed and the current yaw rate of the leader based at least one of the leader angle, the follower angle, the length of the tether, the rate of change of the leader angle, the rate of change of the follower angle, the rate of change of the length of the tether, the follower speed, and the follower yaw rate.

In another example of this aspect, the step of determining the trajectory of the follower comprises determining the desired distance to the point on the predicted heading line and determining the desired change in yaw angle of the follower.

In another example, the desired distance is a distance least traveled from the first coordinate frame to the point on the predicted heading line, and wherein the change in yaw angle of the follower is defined by the first heading line of the leader and the desired distance.

In yet another example, the desired distance may be a distance traveled within a least amount of time from the first coordinate frame to the point on the predicted heading line. In yet another example, the desired distance may be a distance traveled with a least amount of energy from the first coordinate frame to the point on the predicted heading line.

In yet another example, the first heading line of the leader is in coaxial relationship with the first coordinate frame of the follower and wherein the predicted heading line of the leader is in coaxial relationship with the second coordinate frame of the follower.

In still another example, the step of moving the follower along the trajectory to the second coordinate frame comprises determining a desired speed of the follower along the trajectory, the desired speed being based on the desired distance from the first coordinate frame of the follower to the point on the predicted heading line. The step of moving further comprises determining a desired yaw rate of the follower along the trajectory, the desired yaw rate being based on the desired change in yaw angle of the follower. Furthermore, the step of moving comprises moving the follower along the trajectory based on the desired speed and the desired yaw rate.

In another aspect of the disclosure, a method of controlling tethered self-propelled platforms is provided. The method comprises providing a platform leader and a platform follower connected to the leader with a linear tether to define a first heading line of the leader and a first coordinate frame of the follower. The tether may be a linear structure and has a length that is telescopically adjustable to allow linear movement between the leader and follower. Each of the leader and the follower being pivotally moveable relative to the tether, defining a leader angle and a follower angle, respectively.

It is to be understood that the method may provide one platform follower or a plurality of sequentially connected platform followers without departing from the spirit or scope of the present disclosure.

In this aspect, the method comprises determining the leader angle, the follower angle, and the length of the tether, a rate of change of the leader angle, a rate of change of the follower angle, a rate of change of the length of the tether, follower speed and follower yaw rate relative to the first coordinate frame of the follower. The method further comprises estimating a current speed and a current yaw rate of the leader based at least one of the leader angle, the follower angle, the length of the tether, the rate of change of the leader angle, the rate of change of the follower angle, the rate of change of the length of the tether, the follower speed, and the follower yaw rate.

In this aspect, the method further comprises estimating a predicted position of the leader based on a current position, the current speed, and the current yaw rate of the leader relative to the first coordinate frame of the follower, the predicted position of the leader defining a predicted heading line of the leader. Moreover, the method comprises determining a trajectory of the follower from the first coordinate frame to a point on the predicted heading line defining a second coordinate frame of the follower, the trajectory being based on a desired distance to the point on the predicted heading line and a desired change in yaw angle of the follower.

In this aspect, the method further comprises moving the follower along the trajectory to the second coordinate frame based on the desired distance and the desired change in yaw angle of the follower.

In an example of this aspect, the step of estimating the predicted position of the leader comprises determining the leader angle, the follower angle, and the length of the tether relative to the first coordinate frame of the follower. Moreover, the step of estimating comprises estimating the current position of the leader based on at least one of the leader angle, the follower angle, and the length of the tether wherein the current position of the leader is the current location and the current orientation of the leader relative to the first coordinate frame of the follower.

In another example of this aspect, the step of determining the trajectory of the follower comprises determining the desired distance to the point on the predicted heading line and determining the desired change in yaw angle of the follower.

In another example of this aspect, the desired distance is a distance least traveled from the first coordinate frame to the point on the predicted heading line, and wherein the change in yaw angle of the follower is defined by the first heading line of the leader and the desired distance.

In yet another example, the desired distance may be a distance traveled within a least amount of time from the first coordinate frame to the point on the predicted heading line. In yet another example, the desired distance may be a distance traveled with a least amount of energy from the first coordinate frame to the point on the predicted heading line.

In yet another example, the first heading line of the leader is in coaxial relationship with the first coordinate frame of the follower and wherein the predicted heading line of the leader is in coaxial relationship with the second coordinate frame of the follower.

In still another example, the step of moving the follower along the trajectory to the second coordinate frame comprises determining a desired speed of the follower along the trajectory, the desired speed being based on the desired distance from the first coordinate frame of the follower to the point on the predicted heading line. Moreover, the step of moving comprises determining a desired yaw rate of the follower along the trajectory, the desired yaw rate being based on the desired change in yaw angle of the follower. Furthermore, the step of moving comprises moving the follower along the trajectory based on the desired speed and the desired yaw rate.

In another example of this aspect, the current position of the leader is the current location and the current orientation of the leader relative to the first coordinate frame of the follower.

In yet another aspect of the disclosure, a system for controlling tethered self-propelled platforms is provided. The system comprises a leader controller disposed on a platform leader and a follower controller disposed on a platform follower. The platform follower is connected to the platform leader with a linear tether to define a first heading line of the leader and a first coordinate frame of the follower. The tether may be a rigid or non-rigid structure having a length that is telescopically adjustable to allow linear movement between the leader and follower. Each of the leader and the follower is pivotally moveable relative to the tether, defining a leader angle and a follower angle, respectively.

It is to be understood that the system may comprise one platform follower or a plurality of sequentially-connected platform followers without departing from the spirit or scope of the present disclosure.

In this aspect, the system comprises a sensor disposed on the follower and in communication with the controller for sensing a current position, a current speed, and a current yaw rate of the leader relative to the first coordinate frame of the follower. The controller is programmed to estimate a predicted position of the leader based on the current position, the current speed and the current yaw rate of the leader to define a predicted heading line of the leader. Moreover, the controller is programmed to determine a trajectory of the follower from the first coordinate frame to a point on the predicted heading line defining a second coordinate frame of the follower. Furthermore, the trajectory is based on a desired distance to the point on the predicted heading line and a desired change in yaw angle of the follower.

In this aspect, the system further comprises an actuator disposed on the follower and in communication with the controller for moving the follower along the trajectory to the second coordinate frame based on the desired distance and the desired change in yaw angle of the follower.

In an example of this aspect, the controller estimates the predicted position of the leader. To estimate the predicted position of the leader, the controller is programmed to determine the leader angle, the follower angle, and the length of the tether relative to the first coordinate frame of the follower. Moreover, the controller is programmed to estimate the current position of the leader based on at least one of the leader angle, the follower angle, and the length of the tether. The current position of the leader is the current location and the current orientation of the leader relative to the first coordinate frame of the follower.

In an example of this aspect, the controller estimates the predicted position of the leader. To estimate the predicted position of the leader, the controller is programmed to determine the leader angle, the follower angle, and the length of the tether relative to the first coordinate frame of the follower. Moreover, the controller is programmed to determine a rate of change of the leader angle, a rate of change of the follower angle, and a rate of change of the length of the tether relative to the first coordinate frame of the follower. Additionally, the controller is programmed to determine follower speed and follower yaw rate. Furthermore the controller is programmed to estimate the current speed and the current yaw rate of the leader based at least one of the leader angle, the follower angle, the length of the tether, the rate of change of the leader angle, the rate of change of the follower angle, the rate of change of the length of the tether, the follower speed, and the follower yaw rate.

In another example of this aspect, The controller determines the trajectory of the follower. To determine the trajectory of the follower, the controller is programmed to determine the desired distance to the point on the predicted heading line and to determine the desired change in yaw angle of the follower.

In yet another example, the desired distance is a distance least traveled from the first coordinate frame to the point on the predicted heading line, and wherein the change in yaw angle of the follower is defined by the first heading line of the leader and the desired distance.

In yet another example, the desired distance may be a distance traveled within a least amount of time from the first coordinate frame to the point on the predicted heading line. In yet another example, the desired distance may be a distance traveled with a least amount of energy from the first coordinate frame to the point on the predicted heading line.

In still another example, the first heading line of the leader is in coaxial relationship with the first coordinate frame of the follower and wherein the predicted heading line of the leader is in coaxial relationship with the second coordinate frame of the follower.

In another example, the actuator moves the follower along the trajectory to the second coordinate frame based on the desired speed and the desired yaw angle, when the controller determines a desired speed of the follower along the trajectory, the desired speed being based on the desired distance from the first coordinate frame of the follower to the point on the predicted heading line and when the controller determines a desired yaw rate of the follower along the trajectory, the desired yaw rate being based on the desired change in yaw angle of the follower.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

As described in greater detail below, methods and systems of the present disclosure provide enhanced maneuverability of tethered self-propelled platforms or carts while reducing forces thereon. Moreover, the methods and systems of the present disclosure executes a controlled path tracking of such platforms by platform trajectory prediction and planning. As a result, the platforms are controlled with enhanced maneuverability and reduced forces imposed thereon.

Figure 1:
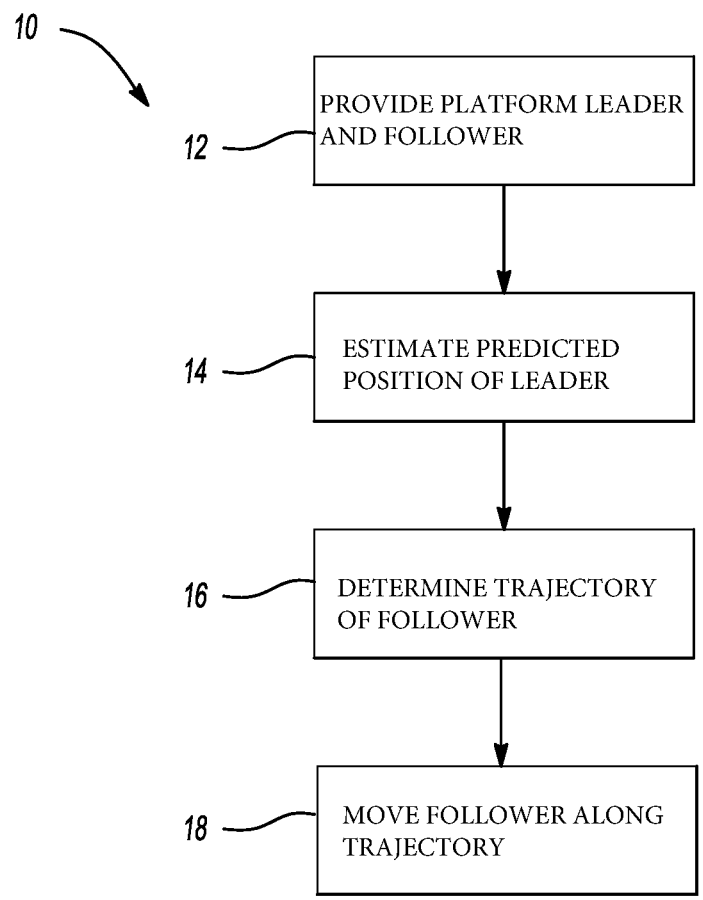
FIG. 1 is a flowchart of a method of controlling tethered self-propelled platforms in accordance with one example of the present disclosure.
Figure 2:
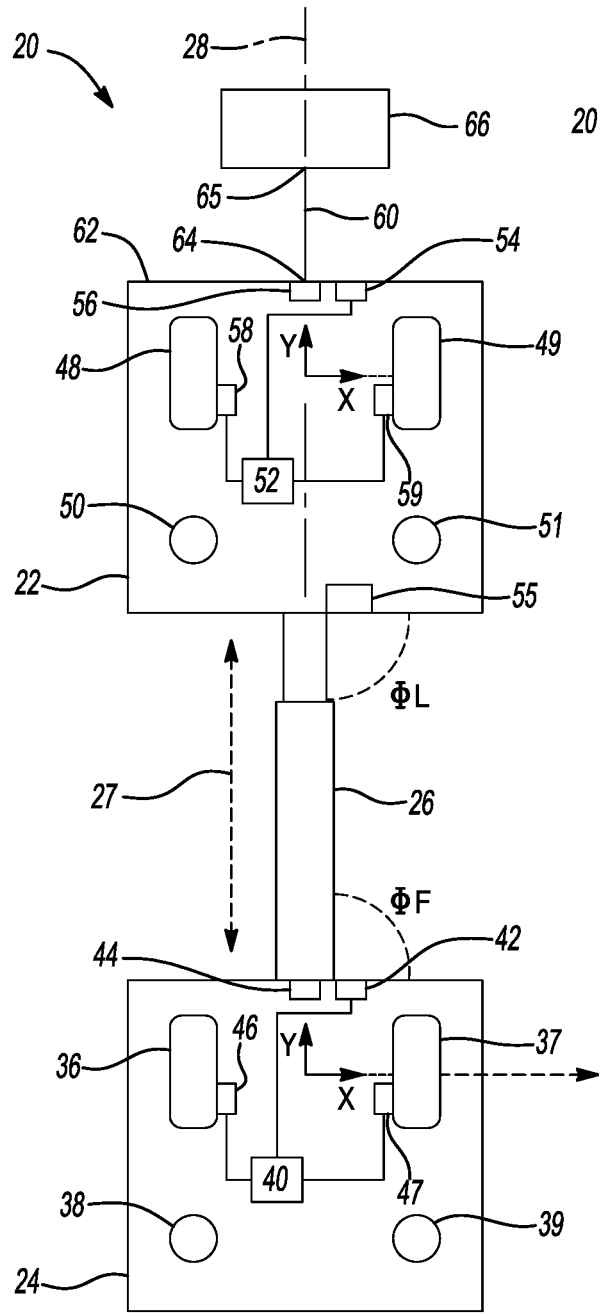
FIG. 2 is a schematic view of a system for controlling tethered self-propelled platforms of the method in FIG. 1.

According one aspect of the present disclosure, a method 10 and system 20 for controlling tethered self-propelled platforms are provided in FIGS. 1 and 2. As shown, the method 10 comprises a step 12 of providing a platform leader 22 and a platform follower 24 connected to the leader 22. The follower 24 is connected to the leader 24 by way of a linear tether 26 to define a first heading line 28 of the leader and a first coordinate frame $(x_1, y_1)$ of the follower. The linear tether 26 may be a rigid or non-rigid structure and has a length 27 that is telescopically adjustable to allow linear movement between the leader 22 and follower 24. Each of the leader 22 and the follower 24 is able to pivotally move relative to the tether 26, defining a leader angle φL and a follower angle φF, respectively.

It is to be understood that the method 10 and system 20 may include one platform follower or a plurality of sequentially-connected platform followers without departing from the spirit or scope of the present disclosure. Such system comprising a platform leader and a plurality of sequentially-connected platform followers defines a platform platoon (or platooning). However, for purposes of describing the method 10 of the present disclosure, one platform leader 22 and one platform follower 24 will be discussed below.

Referring to FIG. 2, the system 20 comprises the platform leader 22 and the platform follower 24 linearly connected to the leader 22 by way of the linear tether 26 which is telescopically movable, allowing linear movement between the leader 22 and the follower 24. The follower 24 comprises a pair of non-pivotable front wheels 36, 37 and a pair of pivotable rear wheels 38, 39. As shown, the platform follower 24 includes a follower controller 40 disposed thereon. The follower 24 further includes a follower rotary sensor 42 and a follower linear sensor 44 disposed adjacent the tether 26. The rotary sensor 42 and the linear sensor 44 are in communication with the follower 24 controller as described in greater detail below. Moreover, the follower 24 includes a pair of follower actuators 46, 47. Each actuator is disposed adjacent one of the non-pivotable front wheels 36, 37. Furthermore, each of the actuators 46, 47 is in communication with the follower 24 controller as described in greater detail below.

Further referring to FIG. 2, the leader 22 may be a platform having components similar to the platform follower 24. Alternatively, the leader 22 may be a system operator who manually operates the system. In this example, the leader 22 is a self-propelled platform having components similar to the platform follower. That is, the platform leader 22 preferably comprises a pair of non-pivotable front wheels 48, 49; a pair of pivotable rear wheels 50, 51; a leader controller 52, a first rotary sensor 54, a leader linear sensor 56; and a pair of leader actuators 58, 59 similar to the pair of non-pivotable front wheels 36, 37 of the follower; the pair of pivotable rear wheels 38, 39 of the follower; the follower controller 40; the follower rotary sensor 42; the follower linear sensor 44; and the pair of follower actuators 46, 47, respectively. Additionally, the leader 22 preferably comprises a second rotary sensor 55 disposed adjacent the linear tether 26 for sensing the leader angle φL discussed in more detail below.

In this example, the platform leader 22 may have a lead-tether 60 disposed thereon at a front side 62 of the leader 22 opposite the linear tether 26. That is, the lead-tether 60 may have first and second ends 64, 65, wherein the first end 64 may be connected to the front side 62 of the leader 22. The second end 65 may be free for handling by a system operator 66 who manually operates the system. Similar to the linear tether 26, the lead-tether 60 is a linear structure and has a length that is telescopically adjustable to allow linear movement between the leader 22 and a system operator. In this example, each of the leader 22 and the operator is able to pivotally move relative to the tether.

As shown in FIGS. 1 and 2, the method 10 further comprises, in box 14, a step of estimating a predicted position 70 of the leader 22 based on a current position, a current speed, and a current yaw rate of the leader relative to the first coordinate frame of the follower. As shown in phantom in FIG. 3, the predicted position 70 of the leader defines a predicted heading line 72 of the leader 22. In this example, the step of estimating the predicted position of the leader comprises determining the leader angle φL, the follower angle φF, and the length 27 of the tether 26 relative to the first coordinate frame of the follower 24. In this example, the rotary sensor 42 may sense the follower angle φF and the rotary senso 55 may sense the leader angle φL relative to the first coordinate frame of the follower 24. The sensors 42, 55 may send a signal to the follower controller 40 accordingly. Moreover, the linear sensor 44 may sense the length 27 of the tether 26 relative to the first coordinate frame of the follower 24 and send a signal to the follower controller 40 accordingly.

Moreover, the step of estimating the predicted position 70 of the leader 22 further comprises the follower controller 40 estimating the current position of the leader based on at least one of the leader angle, the follower angle, and the length of the tether. In this example, the current position of the leader is the current location and the current orientation of the leader relative to the first coordinate frame of the follower.

In this example, the step of estimating the predicted position 70 of the leader further comprises the follower controller 40 determining a rate of change of the leader angle φL, rate of change of the follower angle φF, and a rate of change of the length 27 of the tether relative to the first coordinate frame of the follower. Moreover, the step of estimating the predicted position 70 further comprises the follower controller 40 determining follower speed and follower yaw rate by way of the rotary and linear sensors 42, 44. Then, the follower controller 40 estimates the current speed and the current yaw rate of the leader 22 based on at least one of the leader angle, the follower angle, the length of the tether, the rate of change of the leader angle, the rate of change of the follower angle, the rate of change of the length of the tether, the follower speed, and the follower yaw rate.

Figure 3:
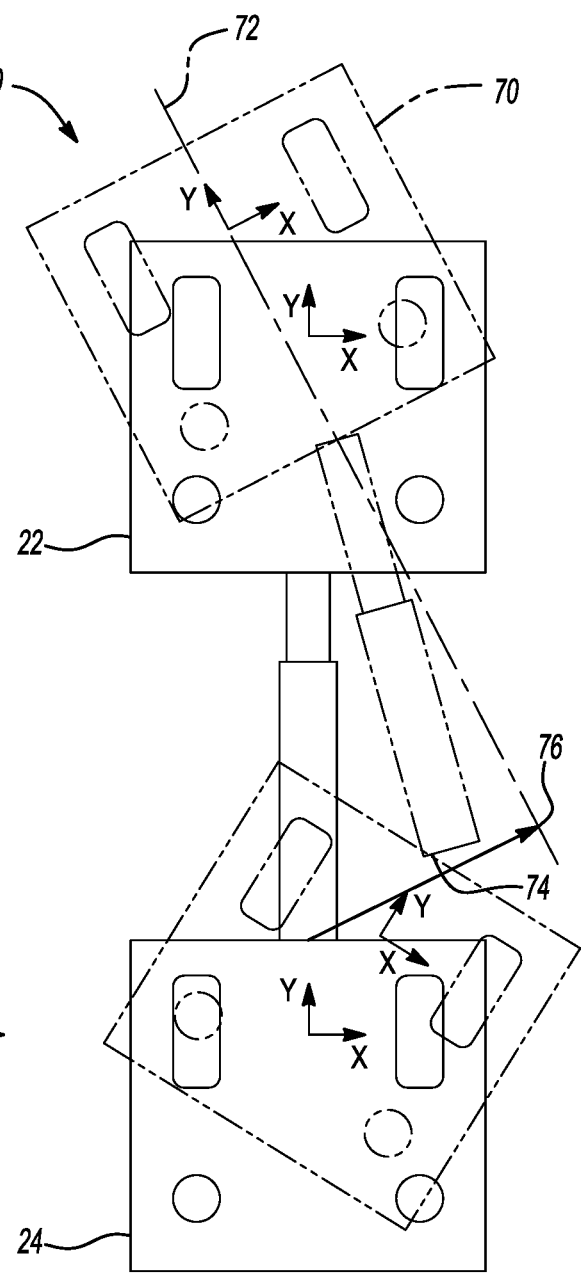
FIG. 3 is a schematic view of the system in FIG. 2 to illustrate a predicted position of a leader platform and a trajectory of a follower platform.

As depicted in FIGS. 1 and 3, the method 10 further comprises, in box 16, the follower controller 40 determining a trajectory 74 of the follower 24 from the first coordinate frame to a point 76 on the predicted heading line 72 defining a second coordinate frame $(x_2,y_2)$ of the follower. The trajectory 74 is based on a desired distance to the point 76 on the predicted heading line 72 and a desired change in yaw angle $\Theta_y$ of the follower. The step of determining the trajectory 74 of the follower 24 comprises the follower controller 40 determining the desired distance to the point 76 on the predicted heading line 72 and determining the desired change in yaw angle $\Theta_y$ of the follower. The desired distance is preferably a distance least traveled from the first coordinate frame to the point 76 on the predicted heading line 72. The desired change in yaw angle $\Theta_y$ of the follower is preferably defined by the first heading line 28 of the leader and the desired distance. The first heading line 28 of the leader is in coaxial relationship with the y-axis of the first coordinate frame of the follower, and the predicted heading line of the leader is in coaxial relationship with the y-axis of the second coordinate frame of the follower.

It is to be understood that the desired distance may also be a distance traveled within a least amount of time from the first coordinate frame to the point on the predicted heading line, a distance traveled with a least amount of energy from the first coordinate frame to the point on the predicted heading line, or any other distance without departing from the spirit or scope of the present disclosure.

As shown in FIGS. 1 and 3, the method 10 further comprises, in box 18, a step of moving the follower 24 along the trajectory 74 to the second coordinate frame based on the desired distance and the desired change in yaw angle $\Theta_y$ of the follower. In this example, the step of moving the follower along the trajectory 74 to the second coordinate frame comprises the follower controller 40 determining a desired speed of the follower along the trajectory 74. Preferably, the desired speed is based on the desired distance from the first coordinate frame of the follower to the point 76 on the predicted heading line 72. Moreover, the step of moving comprises the follower controller 40 determining a desired yaw rate of the follower along the trajectory 74. The desired yaw rate is based on the desired change in yaw angle $\Theta_y$ of the follower.

Furthermore, the step of moving the follower 24 comprises moving the follower along the trajectory 74 based on the desired speed and the desired yaw rate. In this example, the follower controller 40 sends a signal to the pair of follower actuators 46, 47. The follower actuators 46, 47 then provide power to the follower front wheels 36, 37 to move the followers 24 along the trajectory 74.

Figure 4:
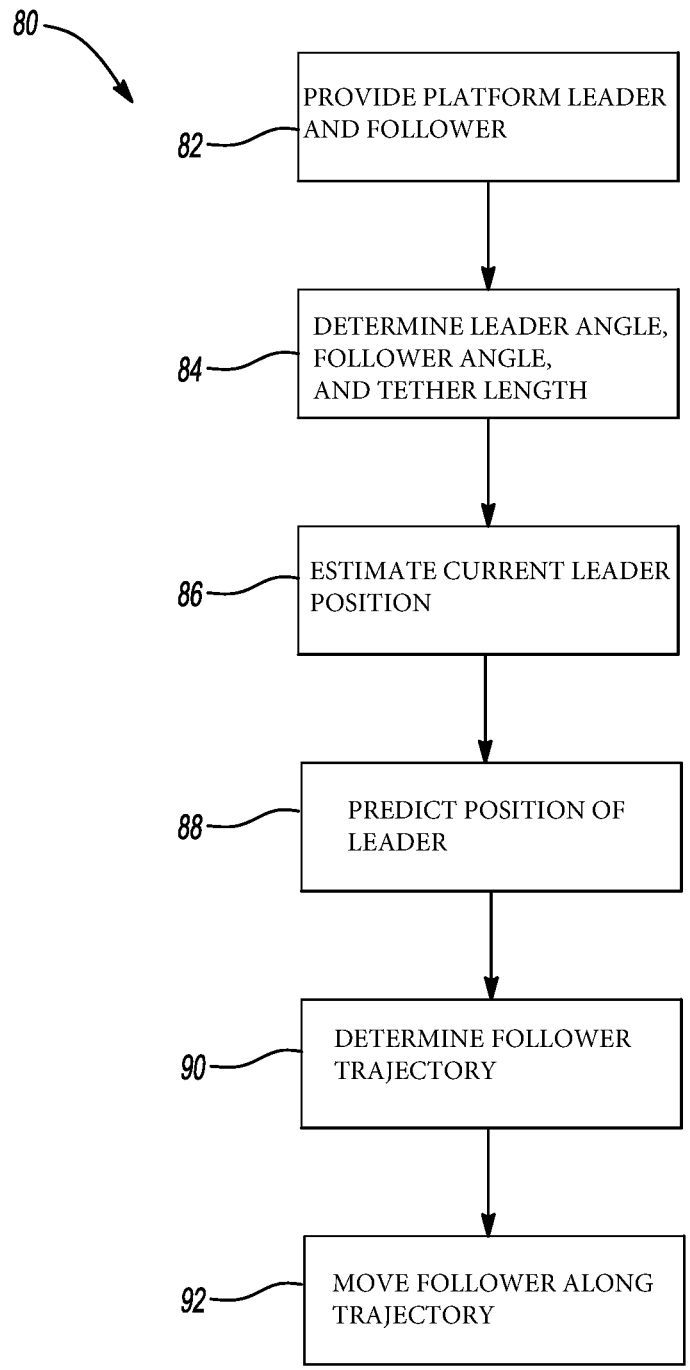
FIG. 4 is a flowchart of a method of controlling tethered self-propelled platforms in accordance with another example of the present disclosure.

FIG. 4 depicts another method 80 of controlling tethered self-propelled platforms (using the system shown in FIG. 2) in accordance with another aspect of the present disclosure. As shown in FIG. 4, the method 80 comprises in box 82 a step of providing the platform leader 22 and the platform follower 24 connected to the leader 22. As depicted in FIG. 2 and described in detail above, the follower 24 is connected to the leader 24 by way of the linear tether 26, and each of the leader 22 and the follower 24 is able to pivotally move relative to the tether 26. As of FIG. 2, terms and components discussed below have been described in detail in previous paragraphs above. As such, the first heading line 28 of the leader 22, the first coordinate frame $(x_1,y_1)$ of the follower, the leader angle $\phi L$, and the follower angle $\phi F$ have been discussed above.

It is to be understood that the method 80 and system 20 may include one platform follower or a plurality of sequentially-connected platform followers without departing from the spirit or scope of the present disclosure. Such system comprising a platform leader and a plurality of sequentially-connected platform followers defines a platform platoon. However, for purposes of describing the method 80 of the present disclosure, one platform leader 22 and one platform follower 24 will be discussed below.

As depicted in FIG. 4, the method 80 further comprises in box 84 determining the leader angle $\phi L$, the follower angle $\phi F$, and the length of the tether 26 relative to the first coordinate frame of the follower 24. As discussed above, the rotary sensor 42 may sense the follower angle $\phi F$ and the rotary sensor 55 may sense the leader angle $\phi L$ relative to the first coordinate frame of the follower 24. The sensors 42, 55 may send a signal to the follower controller 40 accordingly. Moreover, the linear sensor 44 may sense the length 27 of the tether 26 relative to the first coordinate frame of the follower 24 and send a signal to the follower controller 40 accordingly. It is to be understood that the second rotary sensor 55 or any other mechanism may be used to determine the leader angle $\phi L$ without departing from the spirit or scope of the present disclosure. That is, any mechanism disposed on the leader 22, the follower 24, or both may be used to determine the leader angle $\phi L$ without departing from the spirit or scope of the present disclosure.

As shown in FIG. 4, the method 80 further comprises in box 86 the follower controller 40 estimating a current position of the leader based on at least one of the leader angle $\phi L$, the follower angle $\phi F$, and the length 27 of the tether 26. In this example, the current position of the leader is the current location and the current orientation of the leader relative to the first coordinate frame of the follower.

Referring to FIG. 4, the method 80 further comprises in box 88 estimating a predicted position 70 of the leader 22 based on the current position, a current speed, and a current yaw rate of the leader 22 relative to the first coordinate frame of the follower. As discussed above, the predicted position 70 of the leader 22 preferably defines a predicted heading line 72 of the leader 22.

In this example, the step of estimating the predicted position 70 of the leader 22 further comprises the follower controller 40 determining a rate of change of the leader angle $\phi L$, a rate of change of the follower angle $\phi F$, and a rate of change of the length 27 of the tether 26 relative to the first coordinate frame of the follower 24. Moreover, the step of estimating the predicted position 70 further comprises the follower controller 40 determining follower speed and follower yaw rate by way of the rotary and linear sensors 42, 44. Then, the follower controller 40 estimates the current speed and the current yaw rate of the leader based on at least one of the leader angle, the follower angle, the length of the tether, the rate of change of the leader angle, the rate of change of the follower angle, the rate of change of the length of the tether, the follower speed, and the follower yaw rate.

As depicted in FIGS. 3 and 4, the method 80 further comprises in box 90 the follower controller 40 determining a trajectory 74 of the follower 24 from the first coordinate frame to a point 76 on the predicted heading line 72 defining a second coordinate frame $(x_2,y_2)$ of the follower 24. The trajectory 74 is based on a desired distance to the point 76 on the predicted heading line 72 and a desired change in yaw angle $\Theta_y$ of the follower 24. The step of determining the trajectory 74 of the follower 24 comprises the follower controller 40 determining the desired distance to the point 76 on the predicted heading line 72 and determining the desired change in yaw angle $\Theta_y$ of the follower 24. The desired distance is preferably a distance least traveled from the first coordinate frame to the point 76 on the predicted heading line 72. The desired change in yaw angle $\Theta_y$ of the follower 24 is preferably defined by the first heading line 28 of the leader 22 and the desired distance. The first heading line 28 of the leader 22 is in coaxial relationship with the first coordinate frame of the follower 24, and the predicted heading line 72 of the leader 22 is in coaxial relationship with the second coordinate frame of the follower 24.

It is to be understood that the desired distance may also be a distance traveled within a least amount of time from the first coordinate frame to the point on the predicted heading line, a distance traveled with a least amount of energy from the first coordinate frame to the point on the predicted heading line, or any other distance without departing from the spirit or scope of the present disclosure.

As shown in FIGS. 3 and 4, the method further comprises in box 92 a step of moving the follower 24 along the trajectory 74 to the second coordinate frame based on the desired distance and the desired change in yaw angle $\Theta_y$ of the follower. In this example, the step of moving the follower 24 along the trajectory 74 to the second coordinate frame comprises the follower controller 40 determining a desired speed of the follower along the trajectory 74. Preferably, the desired speed is based on the desired distance from the first coordinate frame of the follower 24 to the point 76 on the predicted heading line 72. Moreover, the step of moving comprises the follower controller 40 determining a desired yaw rate of the follower 24 along the trajectory 74. The desired yaw rate is based on the desired change in yaw angle $\Theta_y$ of the follower 24.

Furthermore, the step of moving the follower 24 comprises moving the follower along the trajectory 74 based on the desired speed and the desired yaw rate. In this example, the follower controller 40 sends a signal to the pair of follower actuators 46, 47. The follower actuators 46, 47 then provides power to the follower front wheels 36, 37 to move the follower 24 along the trajectory 74.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of controlling tethered self-propelled platforms, the method comprising:
   providing a platform leader and a platform follower connected to the leader with a linear tether to define a first heading line of the leader and a first coordinate frame of the follower, the tether being a structure having a length that is telescopically adjustable to allow linear movement between the leader and follower, each of the leader and the follower being pivotally moveable relative to the tether, defining a leader angle and a follower angle, respectively;
   estimating a predicted position of the leader based on a current position, a current speed, and a current yaw rate of the leader relative to the first coordinate frame of the follower, the predicted position of the leader defining a predicted heading line of the leader;
   determining a trajectory of the follower from the first coordinate frame to a point on the predicted heading line defining a second coordinate frame of the follower, the trajectory being based on a desired distance to the point on the predicted heading line and a desired change in yaw angle of the follower, wherein the desired distance is one of a distance least traveled from the first coordinate frame to the point on the predicted heading line, and wherein the change in yaw angle of the follower is defined by the first heading line of the leader and the desired distance;
   determining a desired speed of the follower along the trajectory based on the desired distance from the first coordinate frame of the follower to the point on the predicted heading line;
   determining a desired yaw rate of the follower along the trajectory based on the desired change in yaw angle of the follower; and
   moving the follower along the trajectory to the second coordinate frame based on the desired speed, the desired distance and the desired yaw rate of the follower.

2. The method of claim 1 wherein the step of estimating the predicted position of the leader comprises:
   determining the leader angle, the follower angle, and the length of the tether relative to the first coordinate frame of the follower; and
   estimating the current position of the leader based on at least one of the leader angle, the follower angle, and the length of the tether wherein the current position of the leader is the current location and the current orientation of the leader relative to the first coordinate frame of the follower.

3. The method of claim 1 wherein the step of estimating the predicted position of the leader comprises:
   determining the leader angle, the follower angle, and the length of the tether relative to the first coordinate frame of the follower;
   determining a rate of change of the leader angle, a rate of change of the follower angle, and a rate of change of the length of the tether relative to the first coordinate frame of the follower;
   determining follower speed and follower yaw rate; and
   estimating the current speed and the current yaw rate of the leader based on at least one of the leader angle, the follower angle, the length of the tether, the rate of change of the leader angle, the rate of change of the follower angle, the rate of change of the length of the tether, the follower speed, and the follower yaw rate.

4. The method of claim 1 wherein the first heading line of the leader is in a coaxial relationship with the first coordinate frame of the follower and wherein the predicted heading line of the leader is in coaxial relationship with the second coordinate frame of the follower.

5. A method of controlling tethered self-propelled platforms, the method comprising:
   providing a platform leader and a platform follower connected to the leader with a linear tether to define a first heading line of the leader and a first coordinate frame of the follower, the tether being a linear structure and having a length that is telescopically adjustable to allow linear movement between the leader and follower, each of the leader and the follower being pivotally moveable relative to the tether, defining a leader angle and a follower angle, respectively;
   determining the leader angle, the follower angle, and the length of the tether relative to the first coordinate frame of the follower;
   estimating a current position of the leader based on at least one of the leader angle, the follower angle, and the length of the tether, the current position of the leader being the current location and the current orientation of the leader relative to the first coordinate frame of the follower;
   estimating a predicted position of the leader based on the current position, a current speed, and a current yaw rate of the leader relative to the first coordinate frame of the follower, the predicted position of the leader defining a predicted heading line of the leader;

determining a trajectory of the follower from the first coordinate frame to a point on the predicted heading line defining a second coordinate frame of the follower, the trajectory being based on a desired distance to the point on the predicted heading line and a desired change in yaw angle of the follower, wherein the desired distance is a distance least traveled from the first coordinate frame to the point on the predicted heading line, and wherein the change in yaw angle of the follower is defined by the first heading line of the leader and the desired distance;

determining a desired speed of the follower along the trajectory based on the desired distance from the first coordinate frame of the follower to the point on the predicted heading line;

determining a desired yaw rate of the follower along the trajectory based on the desired change in yaw angle of the follower; and moving the follower along the trajectory to the second coordinate frame based on the desired speed, the desired distance and the desired yaw rate of the follower.

6. The method of claim 5 wherein the step of estimating the predicted position of the leader comprises:

determining the leader angle, the follower angle, and the length of the tether relative to the first coordinate frame of the follower;

determining a rate of change of the leader angle, a rate of change of the follower angle, and a rate of change of the length of the tether relative to the first coordinate frame of the follower;

determining follower speed and follower yaw rate; and estimating the current speed and the current yaw rate of the leader based on at least one of the leader angle, the follower angle, the length of the tether, the rate of change of the leader angle, the rate of change of the follower angle, the rate of change of the length of the tether, the follower speed, and the follower yaw rate.

7. The method of claim 5 wherein the first heading line of the leader is in a coaxial relationship with the first coordinate frame of the follower and wherein the predicted heading line of the leader is in coaxial relationship with the second coordinate frame of the follower.

8. A system for controlling tethered self-propelled platforms, the method comprising:

a leader controller disposed on a platform leader and a follower controller disposed on a platform follower, the platform follower being connected to the platform leader with a linear tether to define a first heading line of the leader and a first coordinate frame of the follower, the tether being a structure and having a length that is telescopically adjustable to allow linear movement between the leader and follower, each of the leader and the follower being pivotally moveable relative to the tether, defining a leader angle and a follower angle, respectively;

a sensor disposed on the follower and in communication with the controller for sensing a current position, a current speed, and a current yaw rate of the leader relative to the first coordinate frame of the follower;

wherein the controller is programmed to estimate a predicted position of the leader based on the current position, the current speed and the current yaw rate of the leader to define a predicted heading line of the leader;

wherein the controller is programmed to determine a trajectory of the follower from the first coordinate frame to a point on the predicted heading line defining a second coordinate frame of the follower, the trajectory being based on a desired distance to the point on the predicted heading line and a desired change in yaw angle of the follower, wherein the desired distance is a distance least traveled from the first coordinate frame to the point on the predicted heading line, and wherein the change in yaw angle of the follower is defined by the first heading line of the leader and the desired distance;

wherein the controller is programmed to determine a desired speed of the follower along the trajectory based on the desired distance from the first coordinate frame of the follower to the point on the predicted heading line;

wherein the controller is programmed to determine a desired yaw rate of the follower along the trajectory based on the desired change in yaw angle of the follower; and an actuator disposed on the follower and in communication with the controller for moving the follower along the trajectory to the second coordinate frame based on the desired speed, the desired distance and the desired yaw rate of the follower.

9. The system of claim 8 wherein the controller estimates the predicted position of the leader by:

determining the leader angle, the follower angle, and the length of the tether relative to the first coordinate frame of the follower; and estimating the current position of the leader based on at least one of the leader angle, the follower angle, and the length of the tether wherein the current position of the leader is the current location and the current orientation of the leader relative to the first coordinate frame of the follower.

10. The system of claim 8 wherein the controller estimates the predicted position of the leader by:

determining the leader angle, the follower angle, and the length of the tether relative to the first coordinate frame of the follower;

determining a rate of change of the leader angle, a rate of change of the follower angle, and a rate of change of the length of the tether relative to the first coordinate frame of the follower;

determining follower speed and follower yaw rate; and estimating the current speed and the current yaw rate of the leader based on at least one of the leader angle, the follower angle, the length of the tether, the rate of change of the leader angle, the rate of change of the follower angle, the rate of change of the length of the tether, the follower speed, and the follower yaw rate.

11. The system of claim 8 wherein the controller determines the trajectory of the follower by determining the desired distance to the point on the predicted heading line and determining the desired change in yaw angle of the follower.

12. The system of claim 8 wherein the first heading line of the leader is in a coaxial relationship with the first coordinate frame of the follower and wherein the predicted heading line of the leader is in coaxial relationship with the second coordinate frame of the follower.

* * * * *